US006836817B2

(12) United States Patent
Wang

(10) Patent No.: US 6,836,817 B2
(45) Date of Patent: Dec. 28, 2004

(54) METHOD FOR ACCESSING DATA IN A COMPUTER AND THE COMPUTER THEREOF

(75) Inventor: Chien-Fa Wang, Taipei Hsien (TW)

(73) Assignee: VIA Technologies Inc., Hsin-Tien (TW)

( * ) Notice: Subject to any disclaimer, the term of this patent is extended or adjusted under 35 U.S.C. 154(b) by 218 days.

(21) Appl. No.: 10/063,883

(22) Filed: May 21, 2002

(65) Prior Publication Data

US 2003/0070035 A1 Apr. 10, 2003

(30) Foreign Application Priority Data

Oct. 4, 2001 (TW) ........................................ 90124574 A

(51) Int. Cl.[7] ............................................. G06F 12/00
(52) U.S. Cl. ..................... 711/103; 711/102; 711/104; 711/105; 713/2; 713/100
(58) Field of Search ................................ 711/102, 103, 711/104, 105; 713/2, 100

(56) References Cited

U.S. PATENT DOCUMENTS

| | | | | |
|---|---|---|---|---|
| 5,579,522 A | * | 11/1996 | Christeson et al. ............ 713/2 |
| 5,829,013 A | * | 10/1998 | Hasbun ........................ 711/103 |
| 6,073,206 A | * | 6/2000 | Piwonka et al. ............. 711/102 |
| 6,205,548 B1 | * | 3/2001 | Hasbun ........................... 713/2 |
| 6,536,038 B1 | * | 3/2003 | Ewertz et al. ............... 717/168 |

OTHER PUBLICATIONS

Compaq Computer Corp., Intel Corp., and Phoenix Technologies, Ltd., Extended System Configuration Data Specification, Version 1.02A, May 31, 1994.*

* cited by examiner

Primary Examiner—Donald Sparks
Assistant Examiner—Bao Quoc Truong
(74) Attorney, Agent, or Firm—Winston Hsu

(57) ABSTRACT

A method for data accessing in a computer and the computer thereof is provided. The computer includes a non-volatile memory and a volatile memory, the non-volatile memory having a first portion and a second portion, and the first portion storing the basic input/output system (BIOS) of the computer. The method includes (a) copying data in the second portion of the non-volatile memory to the volatile memory when the computer starts up; (b) updating data stored in the volatile memory when a user wants to update corresponding data in the second portion of the non-volatile memory; and (c) restoring the data in the volatile memory to the non-volatile memory when the computer is ready to shut down.

20 Claims, 7 Drawing Sheets

METHOD FOR ACCESSING DATA IN A COMPUTER AND THE COMPUTER THEREOF

BACKGROUND OF INVENTION

1. Field of the Invention

The present invention relates to a method for accessing data in a computer, and more particularly, to a method for accessing important data in a computer using a flash memory.

2. Description of the Prior Art

Personal computers (PCs) have become an important tool for contacting people or manipulating digital information. Nowadays, information appliances (IAs), manufactured by using a simplified PC structure, have become more popular because of their low-cost and user-friendly characteristics. Even people who are unskilled with computers can easily handle this kind of information appliance.

Because an x86 PC is a well-known structure in computers, an x86 PC is easily implemented to an information appliance. Please refer to FIG. 1. FIG. 1 is a schematic diagram illustrating a typical x86 PC 10 main structure according to the prior art. The PC 10 comprises a CPU (central processor unit) 12 for manipulating and operating data, a volatile RAM (random access memory) 16 and a flash memory 18 for storing BIOS (basic input/output system) of the PC 10. A north-bridge 14A is electrically connected between the RAM 16 and the CPU 12 and is used for exchanging data with both ends.

When the PC 10 starts up, some procedures such as power on self test, plug-and-play, or even hardware configuration will automatically execute upon reading the BIOS stored in the flash memory 18. When the PC 10 completes the above procedures, the PC 10 will load an operating system software. The operating system software coordinates hardware of the PC 10 with corresponding software by determining the setting of the BIOS.

According to the prior art, the flash memory 18 is only used to store the BIOS information and is only used during the start-up procedure of a computer. Therefore, a large portion of the flash memory 18 is wasted. Because the structure of an information appliance is simple, it only needs a smaller BIOS. Thus the flash memory 18 can be used to store other information besides the BIOS. On the other hand, the access time for the non-volatile flash memory 18 is larger than that of a volatile RAM memory 16, so the use of the flash memory 18 for storing ordinary information is limited.

SUMMARY OF INVENTION

It is therefore a primary object of the present invention to provide a method for quickly accessing data from a portion of flash memory that stores ordinary information.

According to the present invention, a method for accessing data in a computer can solve the above problem. The computer comprises a non-volatile memory and a volatile memory. The non-volatile memory comprises a first portion and a second portion. The first portion stores the basic input/output system (BIOS) of the computer. The method comprises (a) copying data in the second portion of the non-volatile memory to the volatile memory when the computer starts up, (b) updating data stored in the volatile memory when a user wants to update corresponding data in the second portion of the non-volatile memory, and (c) restoring the data in the volatile memory to the non-volatile memory when the computer is ready to shut down.

It is an advantage of the present invention that any data accessing operation will not directly through the non-volatile memory, but instead from the volatile memory. The present invention will not write back data from the volatile memory to the non-volatile memory until the computer is ready to shut down. Thus possible damage caused by frequently accessing data from the non-volatile memory is avoided and, of course, the lifetime of the non-volatile memory increases. According to the above paragraphs, the present invention has many superior characteristics and also solves the prior arts drawbacks and inconveniences in the field.

These and other objects of the present invention will no doubt become obvious to those of ordinary skill in the art after reading the following detailed description of the preferred embodiment that is illustrated in the various figures and drawings.

DETAILED DESCRIPTION

Figure 1:
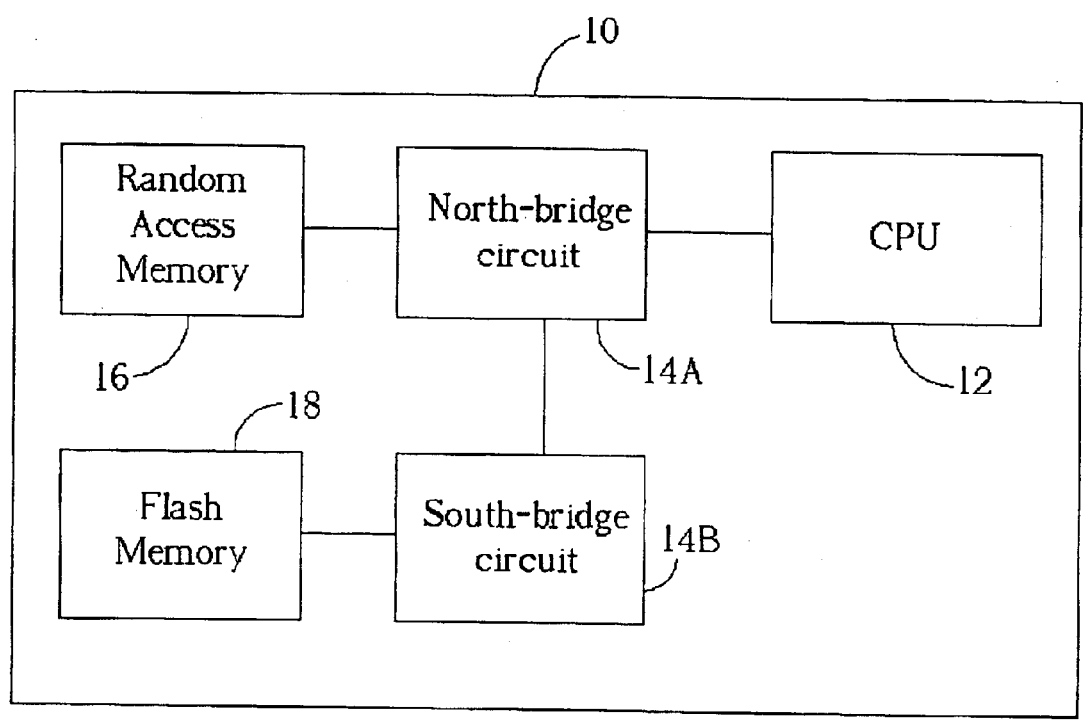
FIG. 1 is a schematic diagram illustrating a typical x86 PC main structure according to the prior art.
Figure 2:
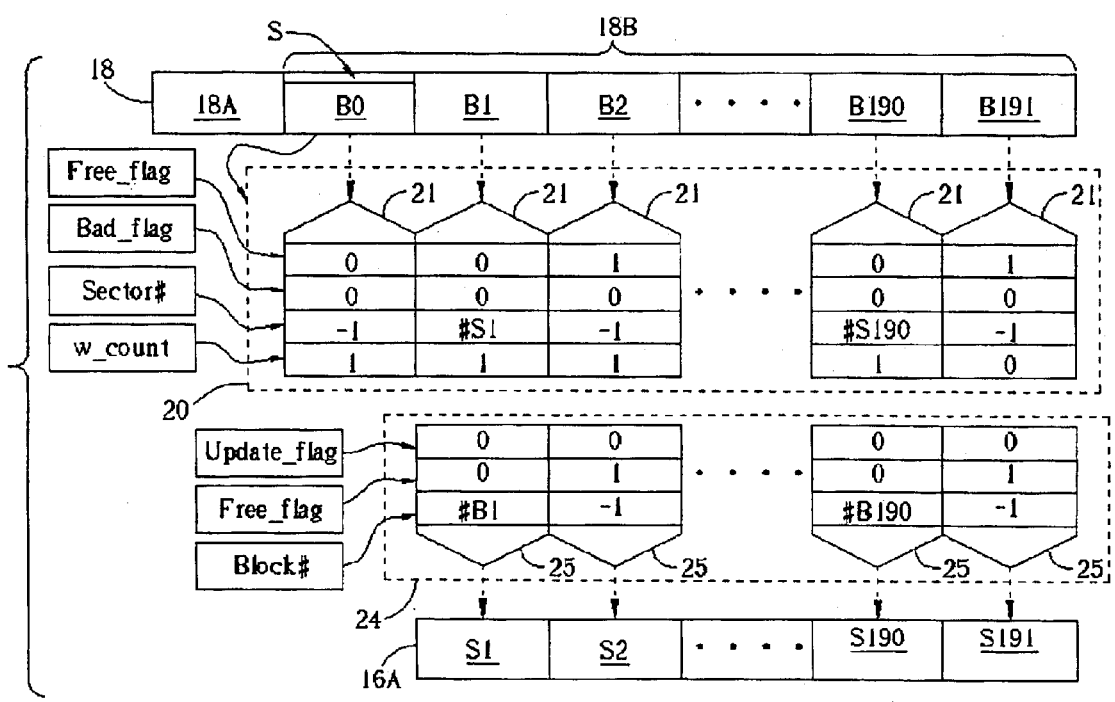
FIG. 2 is a schematic diagram of an allocation of a RAM and a flash memory.

Please refer to FIG. 2. FIG. 2 is a schematic diagram of an allocation of the RAM 16 and the flash memory 18 in a computer (not shown) when the computer just starts up. Notice that other volatile memory can replace the RAM 16, such as a DRAM or an SRAM and other non-volatile memory can replace the flash memory 18, such as an EPROM or an EEPROM. Generally speaking, the flash memory 18 has a plurality of blocks. Data can be written or erased by block in a flash memory. In other words, when the computer is executing an erasing instruction, the data stored in the same block will all be erased at once. As mentioned previously, the BIOS of a computer only occupies a portion of memory space of the flash memory 18. As shown in FIG. 2, a first portion 18A of the flash memory 18 is the memory space used for storing the BIOS, and a second portion 18B of the flash memory 18 is the redundant memory space of the flash memory 18 and it is the spare memory space the method according to the present invention to store ordinary data in. According to the preferred embodiment, the second portion 18B of the flash memory 18 is divided into a plurality of blocks, indexed from B0 to B191.

Each block (for example, block B0) can be used to store a block mapping table 20. The block mapping table 20 is used to manage the memory space of the second portion 18B. A special sign S, established on the header of the block B0, is used to distinguish block B0 from the other blocks in the second portion 18B. For the second portion 18B, the block mapping table 20 comprises a plurality of corresponding block entries for correspondingly showing the state of each block. Dotted arrows between the blocks and the block mapping table entries 21, shown in FIG. 2, represent the corresponding relation between the blocks and the block entries 21. Each block entry 21 needs to comprise at least four fields for effectively managing each block. The four fields are a Free_flag field, a Bad_flag field, a Sector# field, and a w_count field. The Free_flag represents whether the corresponding block is rewritable. For example, a 1 Free_flag represents if the corresponding block does not store any data or the data originally stored in the corresponding block is useless. That is, new data can be written into the block. The Bad_flag represents whether the corresponding block is damaged. That is, no data can be stored in the block anymore. The w_count represents how many times that data is stored in the corresponding block. The definition of the Sector# will be described later. As illustrated in FIG. 2, the block B1 is stored data (Free_flag=0), can be accessed normally (Bad_flag=0), and has been written once (w_count=1).

The RAM 16 will allocate a memory space 16A to store the data originally stored in the second portion 18B of the flash memory 18 because the RAM 16 will replace the flash memory 18 during the normal PC operation. The memory space 16A comprises a plurality of sectors indexed from S1 to S191. Each sector corresponds to a block in the second portion 18B. Each sector's memory space is the same as that of a block. Similarly, the RAM 16 also comprises a sector mapping table 24 for effectively managing each sector of the memory space 16A. The sector mapping table comprises 191 sector entries 25 corresponding to each sector of the memory space 16A. Each sector mapping table entries 25 needs to comprise at least three fields for effectively managing each sector. The three fields are an Update_flag field, a Free_flag field, and a Block# field. The Update_flag represents whether the data stored in the corresponding sector is updated during the operation of a PC, the Free_flag represents whether the corresponding sector stores any data, and the Block# represents which block the corresponding sector corresponds to. In contrast to the sector mapping table 24, the Sector# in the block entries 21 represents which sector that the corresponding block corresponds to. In this preferred embodiment, no sector in the memory space 16A corresponds to the block B0, which is used for storing the block mapping table 20, so the sector# of the corresponding block entry 21 is 1.

Figure 3:
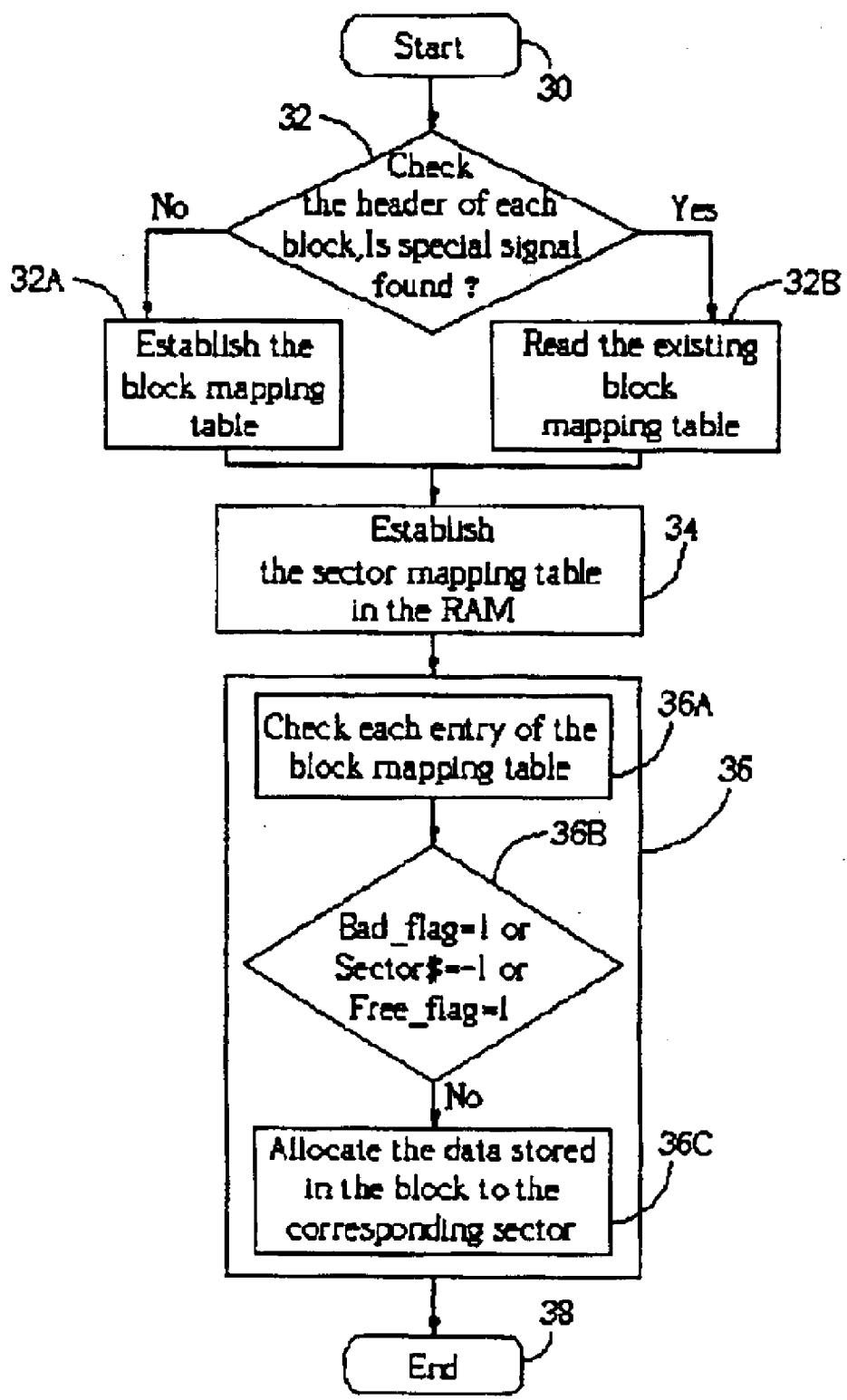
FIG. 3 is a flow chart illustrating steps for allocating a sector mapping table.

FIG. 3 is a flow chart illustrating the steps for allocating the sector mapping table 24. The steps are described as follows:

Step 30:
a computer starts up;(The "start up" step will be executed after a computer has been started up but has not been used by any user.)

Step 32:
check the header of each block in the second portion 18B of the flash memory 18; if the special sign S is found, go to step 32B; otherwise, go to step 32A;(If the special sign S is found in the header of any block, this means that the block mapping table 20 already exists; if the sign S is not found, this means that the block mapping table 20 has not been established yet.)

Step 32A:
establish the block mapping table 20 in the flash; set the initial value of the Free_flag of each block entry 21 to be 1;

set the initial value of the Bad_flag of each block entry 21 to be 0; set the initial value of the sector# of each block entry 21 to be 1; set the initial value of the w_count of each block entry 21 to be 0; go to step 34;(A 1 in Free_flag means that the block in the second portion 18B has not stored any data yet; a 0 in Bad_flag means that the block is not damaged; a 1 in sector# means that the block is not mapped to any sector of the memory space 16A; a 0 in w_count means that the block in the second portion 18B has not stored any data before.)

step 32B:
read the existing block mapping table 20; go to step 34;(The block mapping table 20 already exists and the block stored the block mapping table 20 is also found.)

step 34:
establish the sector mapping table 24 in the RAM 16; set the initial value of the update_flag of each sector entry 25 to be 0; set the initial value of the Free_flag of each sector entry 25 to be 1; set the initial value of the Block# of each sector entry 25 to be 1;(A 0 Update_flag means that the data stored in the corresponding sector is not updated; A 1 Free_flag means that the corresponding sector does not store any data now; A 1 Block# means that the sector does not correspond to any block.)

step 36:
sequentially allocating each block of flash 18B into sectors of the RAM 16 according to each entry of the block mapping table 20;step 36A:check each entry of the block mapping table;(Please notice that each block entry of the block mapping table 20 corresponds to a block of the second portion 18A.)Step 36B:determine the logic value of ((Bad_flag=1) OR (Sector#=-1) OR (Free_flag=1)); if FALSE, go to step 36c; if TRUE, checking the next block of the flash 18B;step 36C:load the data stored in the block into the corresponding sector; update the corresponding sector entry 25; (Since the data stored in the block has been loaded into the corresponding sector, each entry of the sector entry 25 corresponding to the corresponding sector should be updated. That is, the Update_flag is updated to 0 and the Block# is updated by the index of the corresponding block. A user can actually use the computer now.)

step 38:end.

Please refer to FIG. 2 again. Because the block B0 stores the block mapping table 20, the Sector# of the corresponding block entry 21 is 1, and step 36C will not be executed for this block. According to the block entry 21 corresponding to the block B1, because the Free_flag is 0 (stored valid data), the Bad_flag is 0 (undamaged), and the Sector# is #S1 (corresponding to the sector S1), step 36C will be executed and the data stored in the block B1 will be loaded into the corresponding sector S1 in the memory space 16A of the RAM 16. According to the corresponding sector entry 25 of the sector S1, the Free_flag is changed to be 0, the Block# is loaded by the index of the block B1. As far as the block B2 is concerned, because the Free_flag is 1, the block B2 does not store any valid data or the data originally stored in the block is rewritable. Step 36c will not be executed. Each entry in the block entries 21 will be processed from step 36A and 36B. For example, if the block B190 stores valid data, step 36c will load the data into the corresponding sector S190. The Free_flag is changed to be 0. The Block# of the sector S190 is loaded by the index of the block B190.

After all the blocks shown in FIG. 2 have been allocated to RAM 16, a user can access data stored in the second portion 18B of the flash memory 18. A file management program is used to manage the redundant memory space of the flash memory 18 as a non-volatile memory space. For example, the file management program of a windows operating system can use the second portion 18B of the flash memory 18 as a disk in the windows operating system. A user can access data from this virtual disk. However, according to the present invention, data stored in the flash memory 18 will not be directly read even if the user accesses the data stored in the second portion 18B of the flash memory 18 through the use of the file management program, but will access the data stored in each sector of the allocated memory space 16A instead (refer to FIG. 3). That is, when a user accesses data stored in the second portion 18B of the flash memory 18 through the use of the file management program during the operation of a computer, the user in fact accesses data from the memory space 16A of the RAM 16. Therefore, the time wasted by virtually directly accessing data from the flash memory 18 decreases, and the lifetime of the flash memory 18 increases.

When the file management program virtually accesses data from the second portion 18A of the flash memory 18, the file management program actually accesses data from the memory space 16A of the RAM 16 and simultaneously updates the sector mapping table 24. If a user plans to store data in a block of the flash memory 18, the file management program will in fact store the data in the sector corresponding to the block. Moreover, according to the corresponding sector, the Update_flag is changed to be 1 and the Free_flag is set to be 0. On the contrary, if a user plans to erase data from a block through the use of a file management, the file management program in fact erases the data from the corresponding sector. The corresponding Update_flag is set to be 1 (erasing is another form of updating) and the corresponding Free_flag is also set to be 1 (no valid data stored in this sector).

Figure 4:
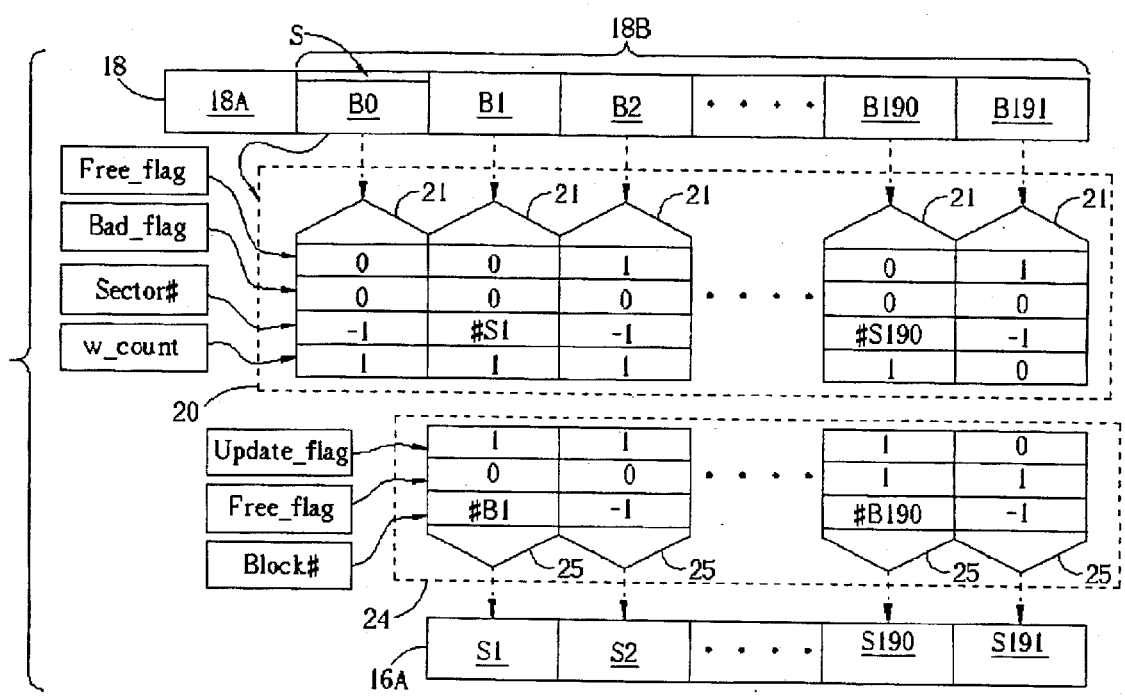
FIG. 4 is a schematic diagram illustrating an allocation of the sector mapping table and related memory during the operation of a computer according to the present invention.

Please refer to FIG. 4. FIG. 4 is a schematic diagram illustrating an allocation of the sector mapping table 24 and the related memory according the present invention during the operation of a computer. It is assumed that a user plans to store data in the sectors S1, S2 and erases data from the S S190 through the use of the file management program. As described previously, the file management program will not access data from the second portion 18B of the flash memory 18, but instead from the memory space 16A of the RAM 16. If new data is to be stored in the sector S1 that originally stored valid data, the file management program only stores the data in the sector S1 and simultaneously changes the Update_flag of the sector entry 25 corresponding to the sector S1 to 1. Similarly, if new data is to be stored in the sector S2 that originally stored no valid data, the file management program will only store the data in the sector 52. Likewise, each entry of the corresponding sector entry 25 is changed. That is, the Update_flag is changed to be 1 and the Free_flag is also changed to 1. If a user plans to erase the data stored in the sector S190, the file management program will only erase the data stored in the sector S190. The Update_flag and the Free_flag are changed to 1. Practically, the file management program does not need to actually "erase" the data stored in the sector S190. All that needs to be done is to change each entry of the corresponding sector entry 25 of the sector.

Figure 5:
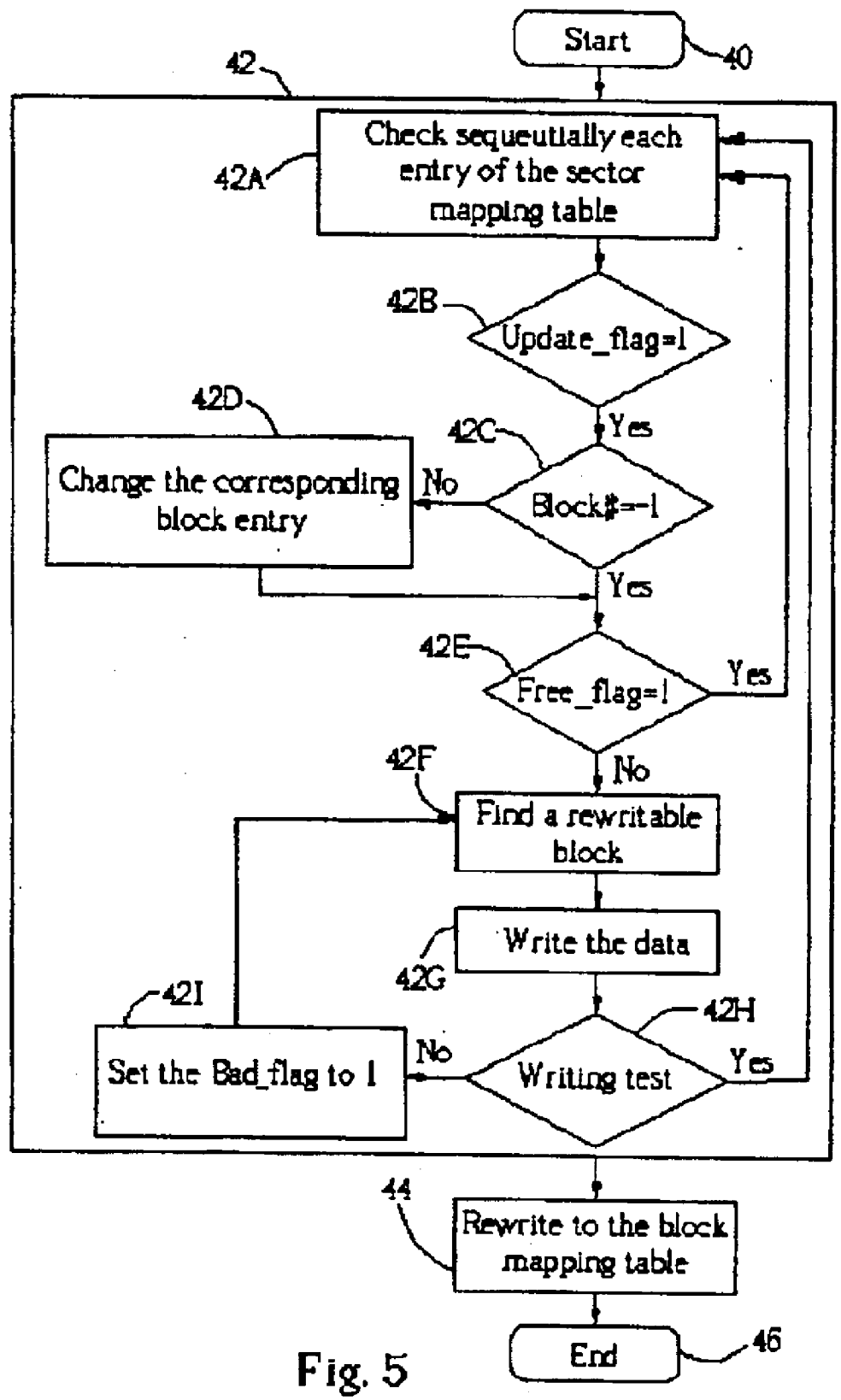
FIG. 5 is a flow chart illustrating writing back steps according to the present invention when a computer is ready to shut down.

During the operation of a computer, the file management program will not actually access data from the second portion 18B of the flash memory 18 until a user is ready to shut down the computer. Then the file management program writes back updated data stored in the memory space 16A of the RAM 16 to the corresponding blocks of the flash memory 18. A detailed description is as follows. Please refer to FIG. 5. FIG. 5 is a flow chart illustrating writing back steps according to the present invention when a computer is ready to shut down. The writing back steps are as follows.

Step 40:

a computer is ready to shut down; set the Free_flag of the block originally storing the block mapping table 20 to be 1;(The rewriting steps begin after the shut down instruction is executed and before the computer is actually shut down. The block mapping table 20 has changed during the operation of the computer, so the Free_flag of the corresponding block entry 21 of the block storing the block mapping table 20 is set to be 1. This means that the block is rewritable.)

step 42:

sequentially writing back each sector to corresponding block of the flash 16 of the sector mapping table 24;

Step 42A:

check each entry of the sector entries 25 of the sector mapping table 24;

Step 42B:

check if the Update_flag is 1; if so, go to step 42C; if not, go to step 42A;(If the Update_flag is not 1, it means that the corresponding sector is not updated during the operation of the computer. Therefore, no writing back is necessary.)

step 42C:

check if the Block# is −1; if so, go to step 42E; if not, go to step 42D;(If the field Block# is −1, it means that the block corresponding to the corresponding sector does not store any data before the computer starts up. The data now stored in the sector is updated during the operation of the computer. if the Block# is not −1, it means that the block corresponding to the sector has stored data in a volatile manner before the computer starts up and has loaded the data in the sector during the initialization steps.)

step 42D:

change the corresponding block entries in the block entries 21 ;(The Free_flag of the corresponding block entry 21 is set to be 1 and the Sector# of the corresponding block entry 21 is set to be 1. The corresponding block is originally stored data, but the data is updated during the operation of the computer. So the data must be written back to the corresponding block. A 1 in Free_flag represents that the corresponding block is rewritable.)

step 42E:

check if the Free_flag is 1; if not, go to step 42F; if so, jump back to start point of step 42A;(If the Free_flag is 1, it means that the data stored in this field are updated, but no valid data are stored in now. On the other hand, if the Free_flag is not 1, it means that the corresponding sector stores updated data and the data need to be written back into the second portion 18B of the flash memory 18.)

step 42F:

find an undamaged, rewritable, and with a smallest w_count block;(Scanning the fields of each block entry 21 of the block mapping table 20 leads to finding a block meeting the above requirements.)

step 42G:

write the data stored in the sector to the block found in step 42F;(In the meanwhile, the entries of the block entry 21 corresponding to the block are also changed. That is, the Free_flag is set to be 0, the sector# is updated with the index of the sector corresponding to the sector entry 25, and the w_count is increased by 1. That is, the number of times the block has been written to is increased by 1.)

step 42H:

writing test; if passed, jump back to start point of step 42A; if not passed, go to step 42I;(Check if data are correctly writes data to the block in step 42G. The checking procedure can be as follows; read the data stored in the block and compare with the data originally stored in the corresponding sector.)

step 42I:

set the Bad_flag to be 1; jump back to step 42F to find another block to write back;(If the writing test fails, it means that the block is damaged. Steps 42F through 42H will be processed until another undamaged, rewritable, and with a smallest w_count block is found.)

step 44:

After all the sectors are written back to corresponding blocks, generate the update data stored in the second portion 18B of the flash memory 18 to a block mapping table 20;(An undamaged, rewritable, and with a smallest w_count block must be found first. The entries of the block entry 21 corresponding to the found block are set according to the following. The Free_flag is set to be 1, the Sector# is set to be 1, and the w_count is increased by 1. The header of the found block is written with the special sign S to specify that the found block is the block storing the block mapping table 20. Of course, a writing test similar to step 42H is still necessary.)

step 46:end this routine and the computer can be shut down.

Figure 6A:
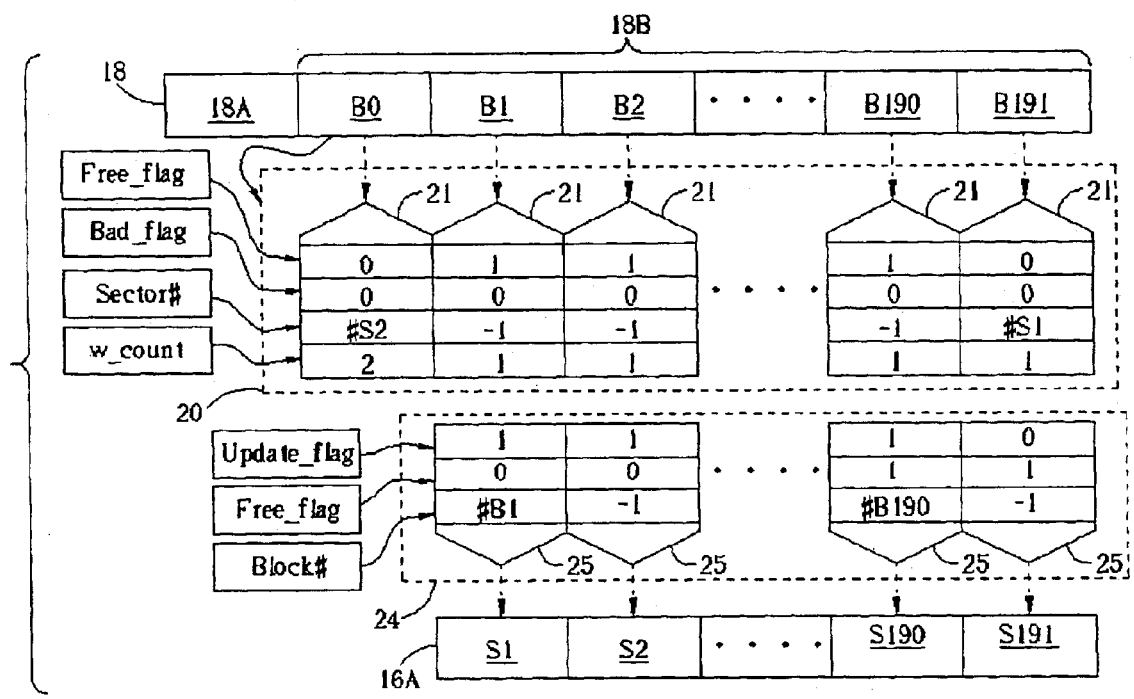
FIG. 6A is a schematic diagram illustrating an allocation of a block mapping table and related memory according to the present invention.

Please refer to FIG. 6A. FIG. 6A is a schematic diagram illustrating the allocation of the block mapping table 20 and the related memory. The data stored in the block mapping table 20 and the related memory shown in FIG. 6A are the data stored in the corresponding memory shown in FIG. 5 when the rewriting steps have just finished step 42. The writing steps shown in FIG. 5 check the sector mapping table 24 from the first sector entry 25 on. The first sector entry 25 corresponds to the sector S1. The corresponding Update_flag is 1. The corresponding Free_flag is 0. The corresponding Block# stores the index of the block B1. The first sector entry 25 undergoes steps 42B, 42C, 42D, and 42E. A detailed description is as follows. Because the data stored in the sector S1 has been updated (The original data stored in the sector S1 is loaded from the block B1 of the flash memory 18. Since the data stored in the block B1 has changed, the block B1 becomes rewritable. The Free_flag of the block entry 21 corresponding to the block B1 is set to be 1 and the Sector# is set to −1), the data need to be rewritten to a block of the flash memory 18. So step 42F scans the block mapping table 20 to find an undamaged, rewritable, and with a smallest w_count block. As an example, the block B191 is assumed to be the block found. In step 42G, the data stored in the sector S1 are rewritten into the block B191. The Free_flag of the block entry 21 corresponding to the block 191 is set to 0, the Sector# is loaded with the index of the sector S1, and the w_count is incremented by 1. Assume this written back data in block B191 has passed checking in step 42H. The routine will then go back to step 42A checking the next sector S2 of the sector mapping table 24.

The sector entry 25 corresponding to the sector S2 will undergo steps 42B, 42C, and proceed directly to 42E. (This means that the data stored in the sector 52 are loaded during the operation of a computer, rather than loaded from the corresponding block during the initialization steps.) Similarly, because the data stored in the sector S2 will be written back to the flash memory 18, steps 42F through 42H are necessary. Assuming that the block found in step 42F is block B0, the data stored in the sector S2 can be written back to the block B0. Furthermore, the Free_flag of the block entry 21 corresponding to the block B0 is changed to 0 (The block B0 originally used to store the block mapping table 20. Because the Free_flag in the block entry 21 corresponding to the block B0 is changed, the block B0 becomes rewritable.), the sector# is set to store the index of the sector 2, and the w_count is incremented by 1. Assume this written back data in block B0 has passed checking in step 42H. The routine will then go back to step 42A checking the next sector S3 of the sector mapping table 24. Please notice that the header S originally stored in the block B0 for labeling the block mapping table 20 is also erased during the writing back steps.

Now, the write back process is sequentially performed through the sector S190. According to the entries of the sector S190, steps 42B, 42C, 42D, and 42E are necessary. This means that the data originally loaded from the block 190 and stored in the sector 190 will be erased during the operation of a computer. So step 42D sets the Free_flag in block entry 21 corresponding to the block 190 to 1 and sets the Sector# to 1 (This means that the block 190 is rewritable. An actual data erasing step is not necessary, because the corresponding block, whose Free_flag is 1, will not load the data to the corresponding sector during step 36B shown in FIG. 3 when the computer starts up again.) The corresponding sector entry of the sector 191 does not need to undergo any write back step because the Update_flag is 0.

Figure 6B:
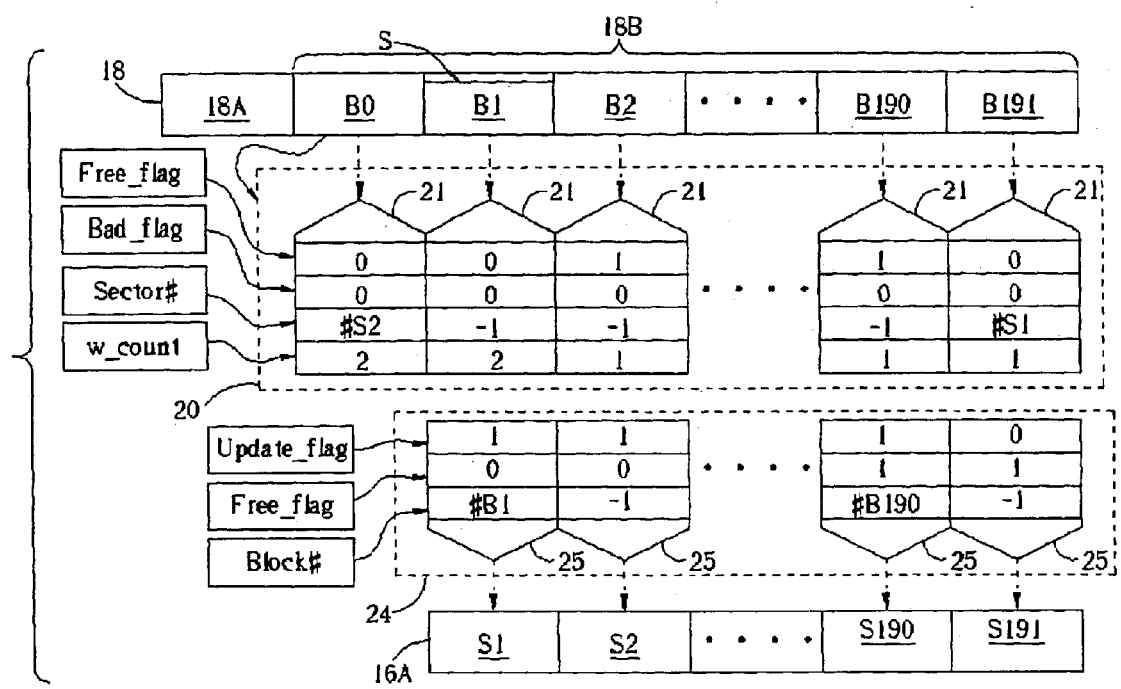
FIG. 6B is a schematic diagram of another allocation of the block mapping table and the related memory according to the present invention.

Please refer to FIG. 6B. FIG. 6B is a schematic diagram of the updated block mapping table 20 and the related memory contents in the flash 18B according to the present invention. The data stored in the block mapping table 20 and the related memory are following the flow chart in FIG. 5 to move the data back from the RAM 16 when the writing back steps have just finished step 44. It is assumed that the block found is block B1, whose corresponding w_count is incremented by 1. Thus the block mapping table 20 can be written in the block B1. Please notice that the special sign S is written in the header of the block B1 for representing that the block B1 is the block storing the block mapping table 20. As soon as the computer starts up again, the block mapping table 20 in block B1 can be found as shown in step 32 of FIG. 3.

In contrast to the prior art, the present invention uses the redundant memory space of the flash memory 18 to store ordinary information, such as personal information. The claimed invention allocates a memory space in the RAM 16 to replace the redundant memory space in the flash memory 18 when a computer just starts up.

Any data accessing operation will not directly operate on the flash memory 18, but on the RAM 16 instead. The claimed invention will not write back data from the RAM 16 to the flash memory 18 until the computer is ready to shut down. Thus a possible damage caused by frequently accessing data from the flash memory 18 is avoided and, of course, the lifespan of the flash memory 18 increases. The present invention also teaches how to write data in the blocks of the flash memory 18 evenly. In the preferred embodiment, the file management program is suited for a network environment, such as a local area network (LAN) of a company or information appliances (IA) through the use of broadband. The present invention has many superior characteristics and also solves the prior arts drawbacks and inconveniences in the field.

Following the detailed description of the present invention above, those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for accessing data in a computer, the computer comprising:
a non-volatile memory, the non-volatile memory comprising a first portion and a second portion, the first portion storing the basic input/output system (BIOS) of the computer, the second portion comprising a plurality of blocks as basic storage units for storing data; and
a volatile memory comprising a plurality of sectors corresponding to the blocks of the second portion of the non-volatile memory;
the method comprising:
establishing a mapping table in the volatile memory for mapping relation between the blocks of the second portion of the non-volatile memory and the sectors of the volatile memory;
allocating data stored in the blocks of the second portion of the non-volatile memory to the corresponding sectors of the volatile memory when the computer starts up;
updating corresponding data stored in the volatile memory when a user wants to update data stored in the second portion of the non-volatile memory; and
writing back the data in the volatile memory to the second portion of the non-volatile memory when the computer is ready to shut down.

2. The method of claim 1, wherein when the user wants to update the data stored in the second portion of the non-volatile memory, a corresponding update operation is executed in the volatile memory without modifying the data in the second portion of the non-volatile memory.

3. The method of claim 1, wherein when the user wants to read data stored in one of the blocks of the second portion of the non-volatile memory, the computer reads data stored in the corresponding sector of the volatile memory.

4. The method of claim 1, wherein the computer updates data stored in the portion of the non-volatile memory according to the mapping table when the computer is ready to shut down.

5. The method of claim 1, wherein writing back the data in the volatile memory to the second portion of the non-volatile memory when the computer is ready to shut down further comprises:
updating the mapping table for changing the mapping relation between the sectors and the blocks; and
restoring the data in the sectors of the volatile memory to the second portion of the non-volatile memory according to the updated mapping table.

6. The method of claim 1, further comprising establishing a second mapping table in the non-volatile memory when the computer is ready to shut down.

7. The method of claim 1, wherein the mapping table is established from a reference mapping table stored in the non-volatile memory when the computer starts up.

8. The method of claim 1, wherein the computer updates the data in the blocks corresponding to the sectors with updated data according to the mapping table when the computer is ready to shut down.

9. The method of claim 1, wherein the computer is an information appliance (IA).

10. The method of claim 1, wherein the non-volatile memory is a flash memory, and the volatile memory is a random access memory (RAM).

11. A computer comprising:
a non-volatile memory comprising a first portion for storing the basic input/output system (BIOS) of the computer and a second portion, the second portion of the non-volatile memory comprising a plurality of blocks as storage units for storing data;
a volatile memory for storing data temporarily during operation of the computer, wherein the volatile memory comprises a plurality of sectors corresponding to the blocks of the second portion of the non-volatile memory; and
a processor;
wherein the processor establishes a mapping table in the volatile memory for recording a mapping relation between the blocks of the second portion of the non-volatile memory and the sectors of the volatile memory; the processor allocates data stored in the blocks of the second portion of the non-volatile memory to the corresponding sectors of the volatile memory when a user starts up the computer; the processor updates data stored in the volatile memory when the user wants to update corresponding data stored in the second portion of the non-volatile memory; and the processor writes back the updated data in the volatile memory to the non-volatile memory when the user is ready to shut down the computer.

12. The computer of claim 11, wherein when the user wants to update the data stored in the second portion of the non-volatile memory, a corresponding update operation is executed in the volatile memory without modifying the data in the second portion of the non-volatile memory.

13. The computer of claim 11, wherein when the user wants to read data stored in one of the blocks of the second portion of the non-volatile memory, the computer reads data stored in the corresponding sector of the volatile memory.

14. The computer of claim 11, wherein the computer updates data stored in the second portion of the non-volatile memory according to the mapping table when the user is ready to shut down the computer.

15. The computer of claim 11, wherein when the user is ready to shut down the computer, a process executed by the processor comprises:
writing back the mapping table for changing the mapping relation between the sectors and the blocks; and
restoring data stored in the sectors of the volatile memory to the second portion of the non-volatile memory according to the updated mapping table.

16. The computer of claim 11, wherein the processor establishes a second mapping table in the non-volatile memory when the user is ready to shut down the computer.

17. The computer of claim 11, wherein the mapping table is established from a reference mapping table stored in the non-volatile memory when the user starts up the computer.

18. The computer of claim 11, wherein the computer updates data of the blocks corresponding to the sectors with updated data according to the mapping table when the user is ready to shut down the computer.

19. The computer of claim 11, wherein the computer is an information appliance (IA).

20. The computer of claim 11, wherein the non-volatile memory is a flash memory, and the volatile memory is a random access memory (RAM).

* * * * *